May 17, 1932.  J. F. ANDERSON  1,858,383
BATTERY TERMINAL PROTECTOR
Filed April 18, 1928
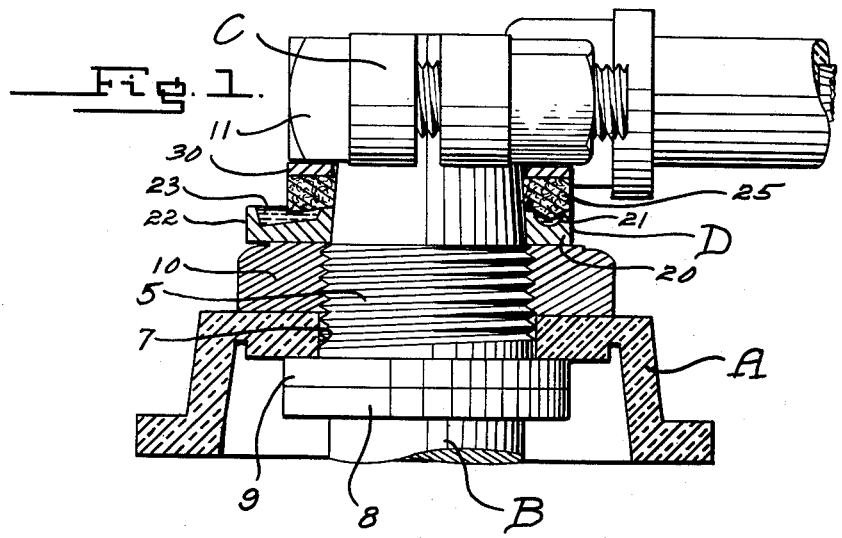
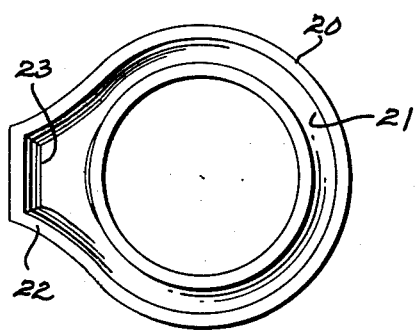
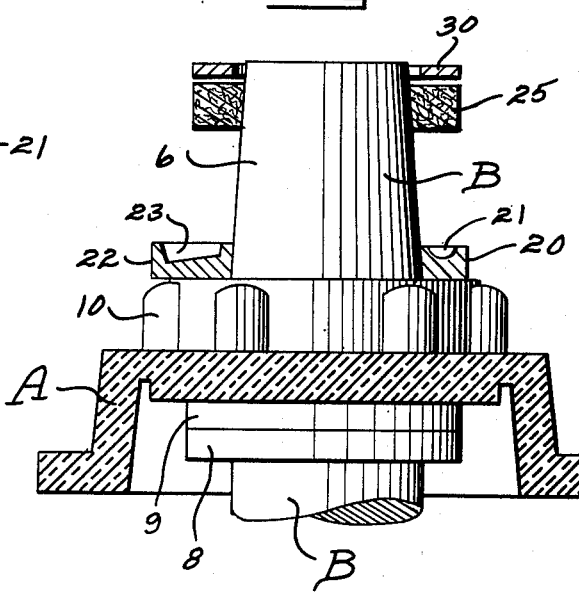
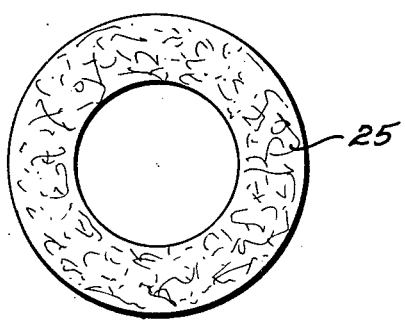
Inventor
James F. Anderson
By Lancaster and Allwine
Attorneys Patented May 17, 1932

1,858,383

UNITED STATES PATENT OFFICE

JAMES F. ANDERSON, OF ST. PETERSBURG, FLORIDA

BATTERY TERMINAL PROTECTOR

Application filed April 18, 1928. Serial No. 270,969.

The present invention relates to protectors for the terminals of storage batteries.

As is well known, considerable trouble is experienced thru corroding of cable terminals of storage batteries thru the action of the battery solution and acid dampness on the cell covers working upwardly on the battery or terminal post to the cable terminals which are usually made of brass or steel. This corrosion and eating away of the acid effected terminal results in poor electrical contact being made between the terminal and battery post and often times renders removal of the cable terminal on the battery post a difficult task without injuring the battery.

It is therefore a primary object of the present invention to provide a battery terminal protector whereby the cable terminal will be protected against corrosion by the battery acid.

A further object of the invention is to provide a battery terminal protector which may be readily applied to existing types of battery terminal posts without any alteration whatsoever to the terminal post.

A further object of the invention is to provide a battery terminal protector embodying an annulus impregnated with an acid resisting substance and adapted to be so associated with the battery terminal post as to act as a barrier for preventing travel of the battery acid along the surface of the terminal post into contact with the cable terminal.

A still further and important object of the invention is to provide a battery terminal protector of extremely simple and durable construction, and which device is retained in position upon the battery terminal post thru attachment of the cable terminal to the post.

A still further object of the invention is to provide a novel protector for battery terminals embodying an annulus of absorbent material for circumferential contact with the battery terminal post, with means for readily replenishing the absorbent annulus with an acid resisting substance.

Other objects and advantages of the invention will be apparent during the course of the following detailed description, taken in connection with the accompanying drawings, forming a part of this specification and in which drawings:

Figure 1 is a view in transverse section thru the improved battery terminal protector shown applied to a battery terminal post of conventional construction.

Figure 2 is a view illustrating the manner in which the protector is applied to the terminal post.

Figure 3 is a top plan view of the washer like element for receiving an acid resisting substance.

Figure 4 is a plan view of the absorbent ring for circumferential contact with the terminal post.

Referring to the drawings in detail, and wherein similar reference characters designate corresponding parts thruout the several views, the letter A designates a conventional type of storage battery cell cover, B a terminal post of the battery mounted in the cover A, C a cable terminal for electrical connection with the upper end of the post B, and D a protector for preventing acid corrosion of the terminal C.

The terminal post B embodies a threaded portion 5 above which projects a tapering upper end or head 6 for attachment of the terminal C. The lower portion of the post B projects thru an opening 7 provided in the cell cover A, and is provided with an annular shoulder 8 above which is disposed a suitable gasket 9 for engagement with the under side of the cover for sealing the opening 7. Threaded upon the post into engagement with the upper side of the cover A is the usual sealing nut 10 which in usual practice is of an acid resisting material such as lead.

In the example shown the terminal C is of the split type and is provided with the usual clamping bolt 11 for contracting the terminal into electrical contact about the upper end of the terminal post. The terminal C is ordinarily made of brass or steel, and as such metals are considerably effected by the acid of the battery solution, the terminals become corroded and so eaten by the acid that poor electrical contact is made between the terminal and battery post, and the clamping bolt becomes corroded to an extent that quite frequently the battery post is broken or the frangible cell cover broken when endeavoring to remove the terminal from the battery post. This corrosion of the cable terminal occurs thru capillary feeding of the acid upwardly along the surface of the terminal post. The protector device forming the subject matter of this invention serves to prevent capillary feeding of the acid upwardly along the battery terminal post to the cable terminal.

Referring now to the specific construction of the protector D, the same embodies a washer like element or ring member 20 which is formed of an acid resisting material such as lead or a suitable alloy not effected by the acid of the battery solution. The ring member 20 has an internal diameter to snugly fit the terminal post head 6, and provided in the upper face of the ring is a groove or channel 21 being spaced inwardly from the walls of the ring as clearly illustrated in Figures 2 and 3. Projecting radially from the outer wall of the ring is a suitable lip or extension 22 having a pocket or cavity 23 in its upper side which communicates with the annularly formed groove or channel 21. As will be observed in Figures 1 and 3, the cavity 23 projects past the circumference of the annular body portion of the ring member and is of slightly greater depth than the annular groove 21. The ring member 20 is preferably provided with a flat under face, and is intended to so fit the tapering terminal post head 6 as to seat upon or be closely spaced from the upper face of the sealing nut 10.

Adapted to encircle the terminal post head above the channeled ring member 20 is a compressible annulus 25 which may be formed from a material such as felt or any other suitable material which may be readily saturated with an oily liquid. The channel or groove 21 is intended to be filled with a suitable oil or other acid resisting liquid which will be absorbed by the felt annulus. This compressible annulus or washer 25 acts as a wick to absorb the acid resisting liquid from the channel 21 and is of an internal diameter such as to be slightly expanded when pressed over the terminal post and thus insures that the annulus has contact thruout the circumference of the terminal post head. The felt annulus or washer 25 is of a width preferably equal to the width of the body portion of the ring member 20 so that the outer end of the pocket or cavity 23 projects past the periphery of the annulus and forms a cup for allowing ready replenishing of the acid resisting liquid for saturation of the annulus. As will readily be observed, the felt annulus 25 will become saturated with the acid resisting liquid in the channel 21 and by reason of the annulus being in contact with the terminal post head, the liquid will be conveyed to the post head and form a barrier for preventing movement of the battery acid by capillary action upwardly along the terminal post head for engaging the cable terminal C.

Adapted to encircle the terminal post head above the compressible annulus 25 is a thin lead washer 30 which is intended to equally compress the annulus thruout its entire circumference to a degree whereby a portion of the lower side of the annulus will be extended slightly into the channel 21 and into contact with the liquid disposed therein. The annulus 25 is not compressed to any considerable degree by the washer 30 and is not compressed beyond a point which would prevent ready saturation of the annulus by the acid resisting liquid placed in the channel of the ring member 20. After the protector sections 20, 25, and 30 have been properly assembled in superposed relation about the terminal post head, the cable terminal may be secured to the terminal post above the lead washer 30 and act as means for retaining the protector sections in properly assembled relation about the terminal post head. The annulus 25 may or may not be impregnated with an oily or other acid resisting liquid prior to application of the protector to the terminal post, and it will be seen that after application of the protector to the terminal post that the annulus may be readily saturated with the liquid thru placing the liquid in the cup formed by the extension 22, and which liquid will readily pass into the channel 21 for proper saturation of the annulus.

From the foregoing description it will be apparent that a novel and extremely simple battery terminal protector has been provided which may be readily applied to various types of battery terminal posts to provide an effective barrier for preventing movement of the battery acid along the surface of the terminal post so as to corrode and eat away the cable terminal.

Changes in detail may be made to the form of invention herein shown and described, without departing from the spirit of the invention or the scope of the following claims.

I claim:

1. A cable terminal protector for the terminal posts of storage batteries comprising a ring member having a radial extension, said extension having a pocket in its upper side communicating with an endless annular channel provided in the upper side of the ring member, said channel to receive an acid resisting liquid, and an annulus of absorbent material arranged in superposed contacting relation with the upper side of the ring member and above the channel provided therein, said annulus to have circumferential contact with the terminal post and being of such external diameter as to not extend over and cover said pocket in the ring extension.

2. In combination, a storage battery cell including a cover and a terminal post projecting upwardly thru the cell cover, a conductor terminal attached to the upper portion of said post, spaced from said cell cover, a ring encircling said post above the battery cover and having an annular oil retaining groove open at its upper face, and an annular wick circumferentially engaging and in intimate contact with said post below the conductor terminal and having a portion projecting into the groove of the ring.

3. In combination, a storage battery cell including a cover and a terminal post projecting upwardly thru the cell cover, a conductor terminal attached to the upper portion of said post, spaced from said cell cover, a ring encircling said post above the battery cover and having an annular oil retaining groove open at its upper face, an annular wick circumferentially engaging and in intimate contact with said post above said ring, and a rigid washer engaging said conductor terminal and wick, and forcing a portion of the latter into said groove.

4. A cable terminal protector for the terminal post of a storage battery comprising, a ring member having an opening of a size to receive with ease, the terminal post and an annular channel open at its upper face to receive an acid resisting liquid, and an annulus of absorbent material having an opening relatively smaller than that of the ring member, so that it must be forced upon the post and engage the post with intimate contact, said annulus at least large enough to cover and extend into said annular channel.

5. The combination of a battery provided with a terminal post, a cable-terminal protector for the said post comprising, a ring member having a radial extension, said extension having a pocket in its upper side communicating with an endless annular channel provided in the upper side of the ring member, said channel adapted to receive an acid resisting liquid, and an annulus of absorbent material arranged in superposed contacting relation with the upper side of the ring member and above the channel provided therein, said annulus being in circumferential contact with the terminal post.

6. In combination, a storage battery cell including a cover and a terminal post projecting upwardly through the cell cover, a ring encircling said post above the cell cover and having an annular oil retaining groove open at its upper face, an annular wick circumferentially engaging and in intimate contact with said post above said ring, a rigid washer engaging said wick, and a conductor terminal attached to the upper portion of said post, said conductor terminal pressing the said washer against the said wick and the said wick against the said ring.

7. In combination, a storage battery provided with a terminal post projecting upwardly from the top thereof, a ring encircling said post above the top of the battery and having an annular oil retaining groove open at its upper surface, an annular wick circumferentially engaging and in intimate contact with said post and said ring, and a conductor terminal attached to the upper portion of said post.

8. An electric terminal, comprising, a terminal post, a ring encircling and forming a tight connection with said post, the said ring having an annular groove at its upper surface thereof, and a washer of absorbent material encircling and forming a tight connection with said post, said washer contacting the upper portion of said ring.

JAMES F. ANDERSON.